(12) United States Patent
Jones

(10) Patent No.: US 12,053,916 B1
(45) Date of Patent: Aug. 6, 2024

(54) FISHING LURE INJECTION MOLDING USING ADDITIVE MANUFACTURING

(71) Applicant: Philip Jones, Montgomery, TX (US)

(72) Inventor: Philip Jones, Montgomery, TX (US)

(*) Notice: Subject to any disclaimer, the term of this patent is extended or adjusted under 35 U.S.C. 154(b) by 0 days.

(21) Appl. No.: 18/216,212

(22) Filed: Jun. 29, 2023

Related U.S. Application Data

(60) Provisional application No. 63/452,319, filed on Mar. 15, 2023.

(51) Int. Cl.
*B29C 33/38* (2006.01)
*B29C 45/14* (2006.01)
*B29C 45/17* (2006.01)
*B29C 45/32* (2006.01)
*B29C 45/58* (2006.01)
*B33Y 80/00* (2015.01)
*A01K 85/00* (2006.01)
*B29K 101/12* (2006.01)
*B29L 31/00* (2006.01)

(52) U.S. Cl.
CPC .......... *B29C 45/32* (2013.01); *B29C 33/3842* (2013.01); *B29C 45/14008* (2013.01); *B29C 45/1742* (2013.01); *B29C 45/58* (2013.01); *B33Y 80/00* (2014.12); *A01K 85/1897* (2022.02); *B29K 2101/12* (2013.01); *B29L 2031/7002* (2013.01)

(58) Field of Classification Search
CPC .. B29C 45/1742; B29C 45/32; B29C 45/3842
See application file for complete search history.

(56) References Cited

U.S. PATENT DOCUMENTS 6,293,779 B1 * 9/2001 Firmin .................... B29C 45/43
425/441

* cited by examiner

*Primary Examiner* — James Sanders
(74) *Attorney, Agent, or Firm* — Richard Eldredge; Leavitt Eldredge Law Firm

(57) ABSTRACT

A molding device for producing thermoplastic articles and its method of use, wherein the molding device comprises a rigid bottom plate, a rigid top plate adapted to be removably coupled to the said bottom plate, a 3D-printed die or insert in the shape of half of the said article removably inserted into a CNC milled mold cavity. The molten thermoplastic material is injected in to the molding device through an injection port to form the thermoplastic in the shape of 3D-printed die or insert, wherein the thermoplastic article is a fishing lure.

1 Claim, 4 Drawing Sheets

FISHING LURE INJECTION MOLDING USING ADDITIVE MANUFACTURING

BACKGROUND

1. Field of the Invention

The present invention relates generally to fishing lure molding devices (or machines), and more specifically to a fishing lure molding device having three-dimensional (3D) printed dies or inserts into a larger computer numerical control (CNC) milled mold and method of use for making plastic injected fishing lures.

2. Description of Related Art

A fishing lure is a broad type of artificial angling product that is designed to mimic real prey animals and attract the attention of predatory fish, using appearances, flashy colors, bright reflections, movements, vibrations, and/or loud noises to appeal to the fish's predation instinct and entice it into striking. As intended, lures are attached to the end of a fishing line and most are equipped with one or more hooks that come in various styles.

There are many types of fishing lures that can be made of wood, plastic, rubber, metal, cork, and materials like feathers, animal hair, string, tinsel, and others. They could also have any number of moving parts or no moving parts. They can be retrieved fast or slowly. Some of the lures can be used alone, or in assembly with another lure. In most cases, they are manufactured to resemble prey for the fish, but they are sometimes engineered to appeal to a fish's sense of territory, curiosity, or aggression. Most lures are made to look like dying, injured, or fast-moving fish. There is always a need for different kinds of fishing lures and molding devices.

Accordingly, although great strides have been made in the area of fishing lure molding devices, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
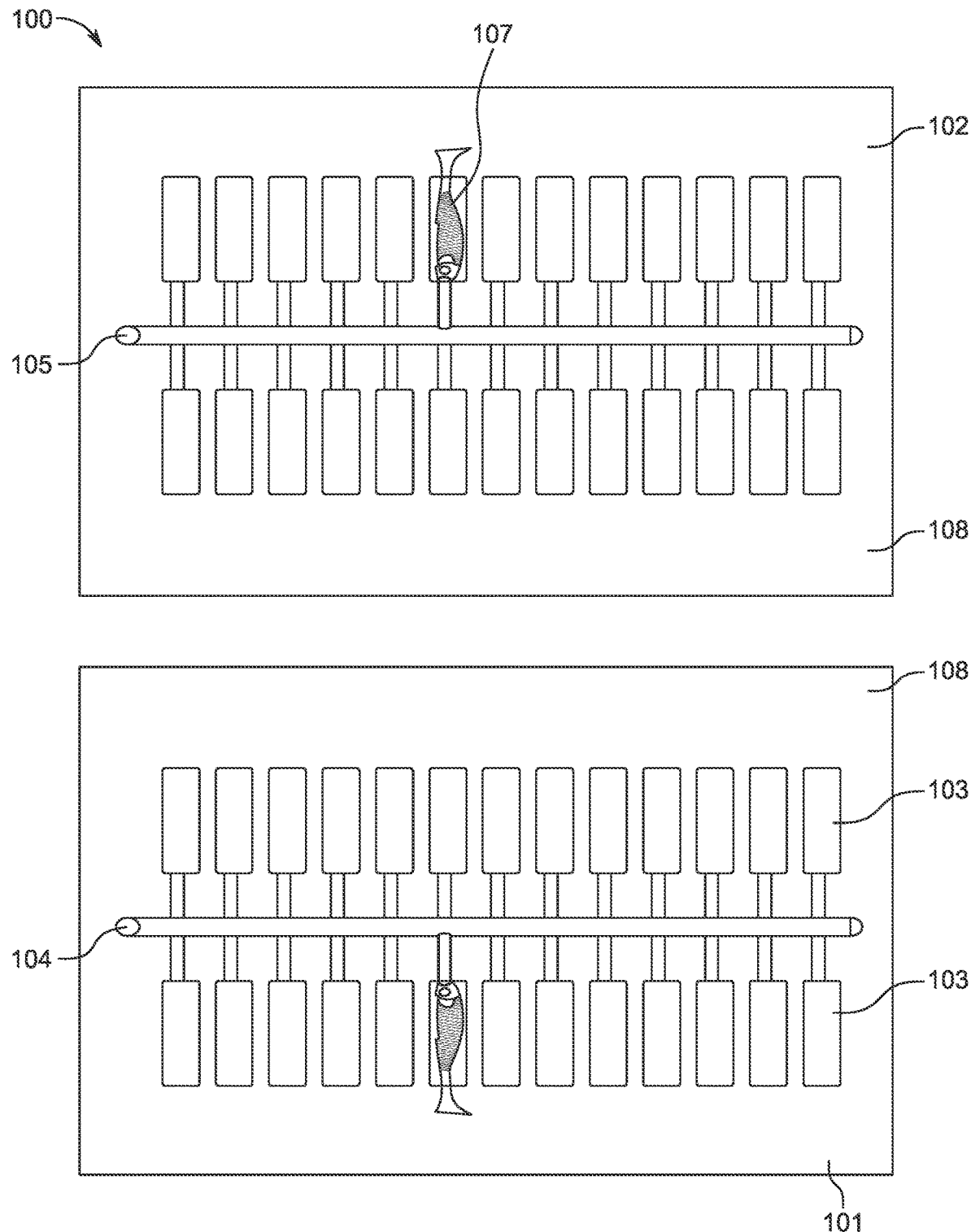
FIG. 1 is a front view of a CNC-milled mold without 3D-printed dies or inserts.
Figure 2:
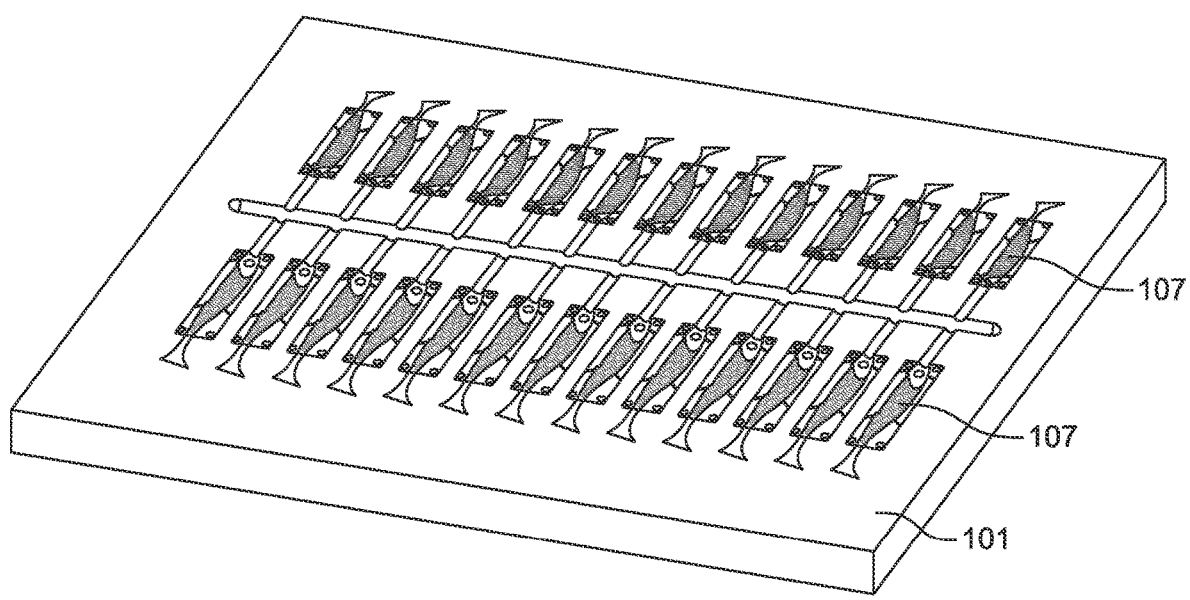
FIG. 2 is a front view of a fishing lure molding device with 3D-printed dies or inserts.
Figure 3:
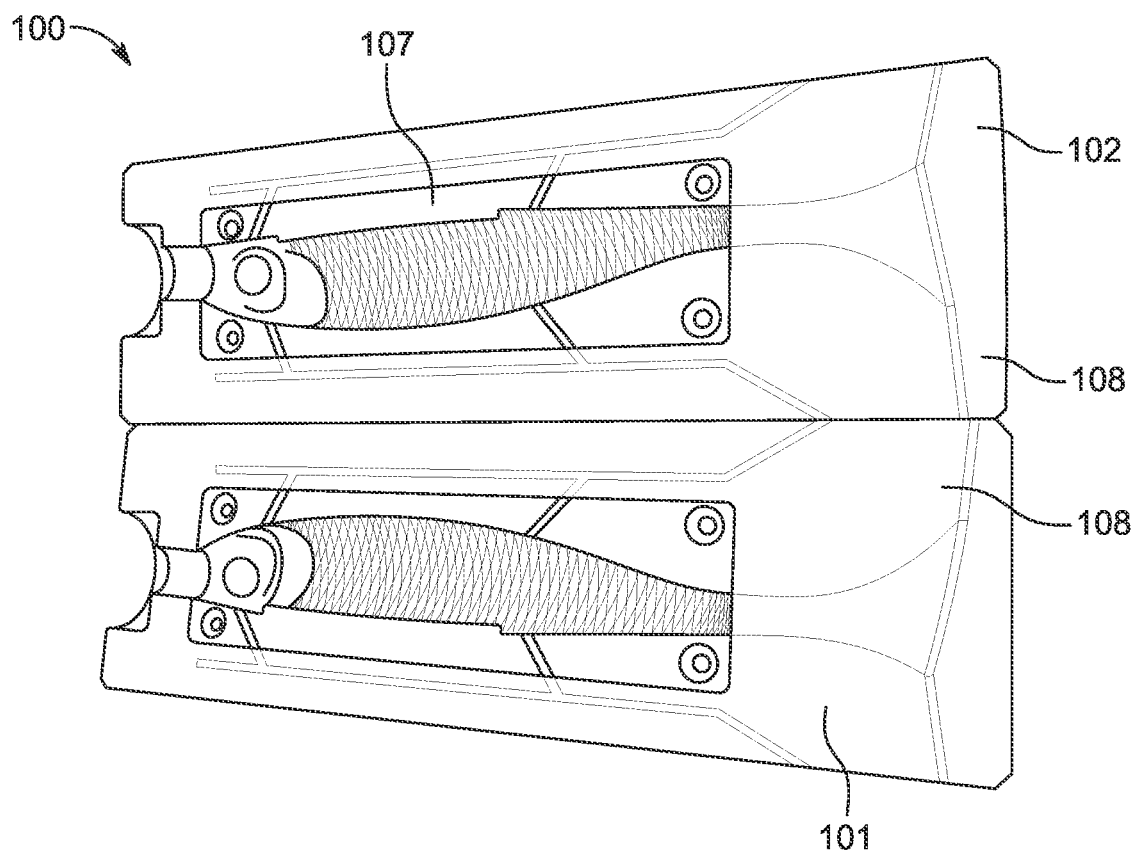
FIG. 3 is a front view of the bottom and top plate of a single mold cavity.

While the fishing lure injection molding using additive manufacturing of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the fishing lure injection molding using additive manufacturing of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The fishing lure injection molding using additive manufacturing will be understood, both as to its structure and operation, from the accompanying drawings, taken in conjunction with the accompanying description. Several embodiments of the device are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments are expressly contemplated herein so that one of ordinary skill in the art would appreciate from this disclosure that the features, elements, and/or functions of one embodiment may be incorporated into another embodiment as appropriate unless described otherwise.

Thermoplastics described herein are a class of polymers that can be softened and melted by the application of heat and can be processed either in the heat-softened state (e.g., by thermoforming) or in the liquid state (e.g., by extrusion and injection molding).

CNC milling described herein is a subtractive manufacturing process that uses a cutting tool mounted on a rotating spindle to selectively remove material from a block of a raw substrate. It starts by fixturing a block of metal or plastic material inside the CNC mill. The CNC machine is programmed to rapidly mill out parts from the block of the raw substrate.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein reference characters identify corresponding or similar elements throughout the several views, FIGS. 1-5 depict different views of a fishing lure molding device in accordance with a preferred embodiment of the present application. It will be appreciated that fishing lure molding device 100 overcomes one or more of the above-listed problems commonly associated with conventional fishing lure molding devices. In addition, it should be appreciated that more or fewer of such components may be included in different embodiments of the fishing lure molding device 100.

In the contemplated embodiment as illustrated in FIG. 1, a fishing lure molding device 100 comprises two halves including a rigid bottom plate 101 and a rigid top plate 102. The top plate 102 couples with the bottom plate 101 to form the mold.

The bottom plate 101 and the top plate 102 interiorly define one or more mold cavities 103 and injection ports 104, and 105. When plates 101, and 102 couple and align properly, injection ports 104, and 105 combine to provide an entrance for the conduction of the thermoplastic material into the mold cavities 103. The injection of the thermoplastic material into the mold cavities 103 and the subsequent shaping and curing therein results in the production of a fishing lure 106. The bottom plate 101 and the top plate 102 may further comprise ventilation ports that combine to provide an exit to allow entrapped air to escape from the mold.

Figure 4:
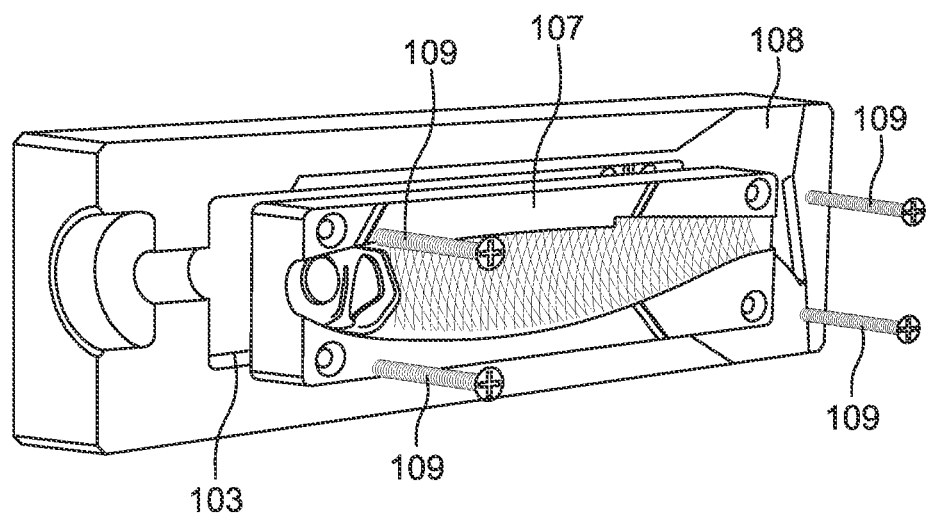
FIG. 4 is an exploded view of a 3D-printed die or insert of FIG. 4.
Figure 5:
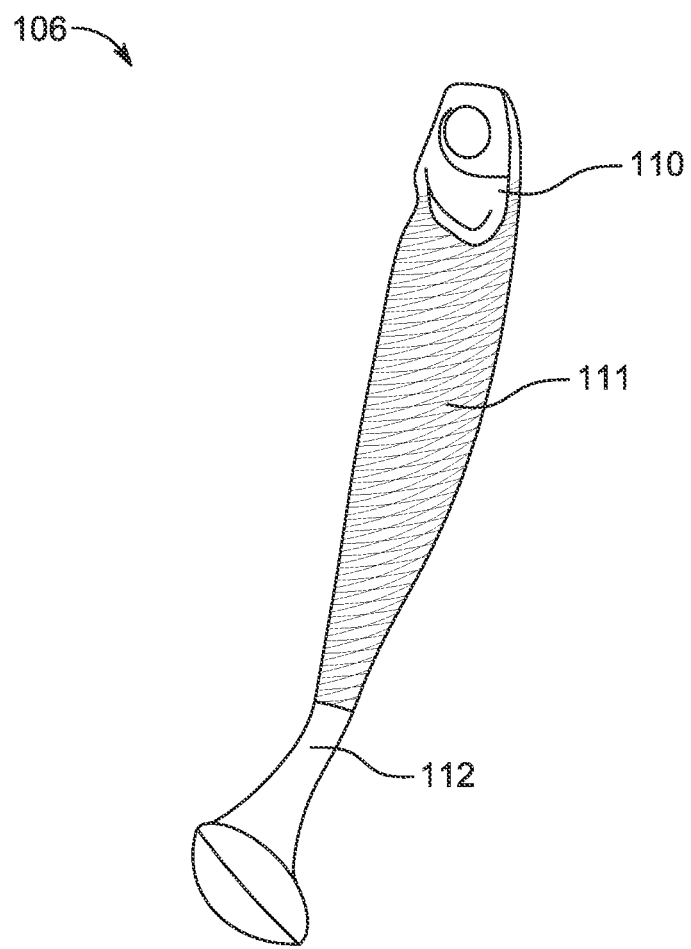
FIG. 5 is a perspective view of a fishing lure made from the fishing lure molding device of the present invention.

Each mold cavity 103 of the bottom plate 101 and the top plate 102 comprise a three-dimensional (3D) printed die or insert 107 removably inserted into a larger computer numerical control (CNC) milled mold 108 with the help of a plurality of fastening screws 109 as shown in FIG. 4. Each mold cavity 103 of the bottom plate 101 and top plate 102 upon mating forms the shape of a fishing lure comprising a head end 110, a body 111, and a tail end 112 as shown in FIG. 5. The fishing lure molding device of the present invention can comprise one or more cavities, cavities depending on the product and as per need.

The pieces inside the mold would be the 3D-printed dies that would be assembled inside the steel-milled mold. The scale of the mold could vary from one or more cavities depending on the product The method of use 200 of the fishing lure molding device 100 is an injection molding process, in which the rigid top plate 102 aligns and couples with the rigid bottom plate 101. The thermoplastic material is heated and conducted under pressure to the injection ports 104, and 105 where it is injected into the mold. The molten material flows through the injection ports 104, and 105 down the channels into the three-dimensional (3D) printed dies or inserts 107 removably inserted into the mold cavities 103. The molten material enters at the head end 110 of each mold cavity 103 and assumes the shape of a fishing lure, which upon curing, is removed from the molding device 100.

The injection ports 104, and 105 and channels may be arranged in any desired configuration. The thermoplastic material used in the present invention can be any heat-moldable soft plastic or any other suitable plastic which can be subjected to an injection molding process.

The 3D printed dies or inserts of the present invention can be used for small-scale, and large-scale production of any thermoplastic article of interest in different shapes and sizes. The 3D printed dies or inserts provide higher product detail, customizable and interchangeable molds, are suitable for complex geometrical designs, and result in lower manufacturing costs.

The 3D printed dies or inserts of the present invention can be made of any suitable material including but not limited to metal, plastic, resin, etc.

The fishing lure molding device of the present invention provides a mold that is relatively simple to clean, which will reduce labor requirements and result in increased production and reduced cost of the end product.

The method of use of the fishing lure molding device can be manual or partially or completely automated operation and can be a single-step injection molding process.

The molding device of the present invention can be configured to produce any other suitable thermoplastic or soft plastic injected products apart from fishing lures.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A molding device for producing thermoplastic articles, comprising:
   a rigid bottom plate;
   a rigid top plate adapted to be removably coupled to said bottom plate, the rigid top plate having a void that forms a tail end of a fishing lure;
   at least one CNC milled mold cavity partially extending within a thickness of the rigid top plate;
   at least one 3D-printed die in the shape of a body and head of a fishing lure, the at least one 3D-printed die is configured to fit within the CNC milled mold cavity such that the body and the head are in communication with the tail end;
   a plurality of fastening screws that removably secure the at least one 3D-printed die to the at least one CNC milled mold cavity;
   at least one injection port for injecting a thermoplastic material into the said 3D-printed die;
   wherein the fishing lure is removed from the molding device after a curing process.

* * * * *